United States Patent
Amos et al.

(10) Patent No.: US 7,897,710 B2
(45) Date of Patent: Mar. 1, 2011

(54) BIMODAL POLYETHYLENE FILM

(75) Inventors: John Amos, Tervuren (BE); Choon Kooi Chai, Overijse (BE); Luc Marie Ghislain Dheur, Montroeul-au-Bois (BE)

(73) Assignee: Ineos Manufacturing Belgium NV, Antwerpen (BE)

( * ) Notice: Subject to any disclaimer, the term of this patent is extended or adjusted under 35 U.S.C. 154(b) by 197 days.

(21) Appl. No.: 11/660,355

(22) PCT Filed: Aug. 12, 2005

(86) PCT No.: PCT/EP2005/008798
§ 371 (c)(1),
(2), (4) Date: Feb. 16, 2007

(87) PCT Pub. No.: WO2006/018245
PCT Pub. Date: Feb. 23, 2006

(65) Prior Publication Data
US 2008/0097054 A1    Apr. 24, 2008

(30) Foreign Application Priority Data
Aug. 20, 2004    (GB) .................................. 0418581.5

(51) Int. Cl.
C08F 10/02    (2006.01)

(52) U.S. Cl. .................. 526/348.1; 428/216; 502/103; 502/117; 502/118; 502/129; 502/132; 502/133; 525/240; 526/90; 526/123.1; 526/124.2; 526/124.3; 526/124.4; 526/124.5; 526/154; 526/155; 526/157; 526/158; 526/210; 526/237; 526/348; 526/348.2; 526/348.6

(58) Field of Classification Search .................... 526/90, 526/123.1, 124.2, 124.3, 124.4, 124.5, 154, 526/155, 157, 158, 210, 237, 348, 348.1, 526/352; 502/103, 117, 118, 129, 132, 133
See application file for complete search history.

(56) References Cited

U.S. PATENT DOCUMENTS

| 4,071,672 A | * | 1/1978 | Kashiwa ........................ 526/122 |
| 4,307,209 A | * | 12/1981 | Morita et al. ................ 525/246 |

(Continued)

FOREIGN PATENT DOCUMENTS

| EP | 1 333 044 A1 | 8/2003 |
| WO | WO 02102891 A1 * | 12/2002 |

OTHER PUBLICATIONS

PCT International Preliminary Report on Patentability; International Application No. PCT/EP2005/008798; International Filing Date Aug. 12, 2005; PCT/IB/373 (1 pg).

(Continued)

*Primary Examiner* — Vasu Jagannathan
*Assistant Examiner* — Richard A Huhn
(74) *Attorney, Agent, or Firm* — Nixon & Vanderhye (57) ABSTRACT

Film formed from a polyethylene resin composition which obeys a dynamic rheological relationship at 190° C. between melt storage modulus G', measured in Pa and at a dynamic frequency where the loss modulus G''=3000 Pa, and dynamic complex viscosity $\eta^*_{100}$, measured in Pa·s at 100 rad/s, such that (a) $G'(G''=3000) > -0.86\eta^*_{100} + z$ where z=3800, and at the same time (b) $G'(G''=3000) > 0.875\eta^*_{100} - y$ where y=650, and having an impact strength (DDT) of at least 250 g, measured on 15 μm thick film (blown under conditions with BUR=5:1 and Neck Height=8×D) conditioned for 48 hours at 20°-25° C., according to ASTM D1709.

23 Claims, 1 Drawing Sheet

U.S. PATENT DOCUMENTS

| | | | |
|---|---|---|---|
| 4,547,551 A | | 10/1985 | Bailey et al. |
| 4,603,173 A | * | 7/1986 | Mack et al. .................. 525/194 |
| 5,648,309 A | * | 7/1997 | Bohm .......................... 502/105 |
| 6,316,546 B1 | * | 11/2001 | Ong et al. ....................... 525/53 |
| 6,455,642 B1 | * | 9/2002 | Myhre et al. ................... 526/64 |
| 6,713,561 B1 | * | 3/2004 | Berthold et al. .............. 525/191 |
| 7,232,866 B2 | * | 6/2007 | Houpert et al. ................. 526/65 |
| 2003/0120001 A1 | * | 6/2003 | Canham et al. ................. 526/64 |

OTHER PUBLICATIONS

Written Opinion of the International Searching Authority; PCT/EP2005/008798; International Filing Date Aug. 12, 2005; PCT/ISA/237 (5 pgs).

* cited by examiner

BIMODAL POLYETHYLENE FILM

This application is the U.S. National Phase of International Application PCT/EP2005/008798, filed 12 Aug. 2005, which designated the U.S. PCT/EP2005/008798 claims priority to British Application No. 0418581.5 filed 20 Aug. 2004. The entire content of these applications are incorporated herein by reference.

The present invention relates to films made from ethylene polymer compositions particularly to films made from mul-timodal polymers comprising a homopolymer and a copolymer of ethylene, and also to processes for making such polymers and films.

Patent application EP 897934A describes a compound comprising an ethylene polymer with high melt index ($MI_2$ from 5 to 1000 g/10 min) and an ethylene and hexene polymer with low melt index ($MI_5$ from 0.01 to 2 g/10 min), the ratio by weight of these polymers being equal of (30 to 70):(70 to 30). These polymers are made using Ziegler-Natta catalysts such as are described in U.S. Pat. Nos. 3,901,863, 4,929,200 and 4,617,360 (Solvay). They are said to be suitable for making into films.

In order to obtain an industrial resin based on high molecular weight (HMW) ethylene homopolymers and copolymers which has improved strength and mechanical properties, the rheological and structural properties of the resin must be tailored appropriately, so as to achieve a balance of good processability (e.g., bubble stability, extrudability, etc.) and good mechanical properties. Improved mechanical properties of HMW resins are associated with enhanced tie molecule density in the high molecular weight chains, and also with appropriate comonomer content/distribution. The appropriate rheological properties for such HMW resins can be achieved by adjusting structural parameters such as molecular weight (Mw), molecular weight distribution (MWD) and long chain branching (LCB) to achieve the desired melt elasticity and melt strength needed for good bubble stability in film blowing processes, and the desired viscosity for improved extrudability. Post-reactor modifications by appropriate compounding with reticulation agents (eg. oxygen and peroxides) can also be employed to achieve the desired rheological properties without detrimental effects on the tie-molecule populations in the high molecular chains; this permits the retention of the desired balance of film processability, extrudability and mechanical properties. The blending of non-reticulated, or lightly reticulated resins with highly reticulated resins can also be employed to improve the desired balanced processability and mechanical properties.

We have now found a range of polymer compositions which is capable of making films with improved rheology and film properties.

In its broadest aspect, the present invention provides a film formed from a polyethylene resin composition which obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>−0.86$\eta^*_{100}$+z where z=3800, and at the same time (b) G'(G"=3000)>0.875$\eta^*_{100}$−y where y=650, and having an impact strength (DDT) of at least 250 g, measured on 15 μm thick film (blown under conditions with BUR=5:1 and Neck Height=8×D) conditioned for 48 hours at 20°-25° C., according to ASTM D1709.

In a preferred embodiment the polyethylene resin composition is a multimodal composition comprising from 30 to 70 wt % of an ethylene polymer (A) having a melt index $MI_2$ of 5-1000 g/10 min and a density of at least 965 kg/m³, and from 30 to 70 wt % of an ethylene polymer (B) having a melt index $MI_5$ of 0.001-2 g/10 min and a density of 910 to 945 kg/m³.

It is particularly preferred that ethylene polymer (A) is a homopolymer, and the ethylene polymer (B) is a copolymer of ethylene and a $C_4$-$C_8$ alpha-olefin.

By "multimodal" polyethylene is meant polyethylene having at least two components of different molecular weights and compositions (ie comonomer content). Preferably the resin composition is bimodal, that is to say it has just two such components, although each component may itself be multimodal.

An alternative aspect of the invention provides a film formed from a multimodal polyethylene resin composition which comprises from 30 to 70 wt % of an ethylene homopolymer (A) having a melt index $MI_2$ of 5-1000 g/10 min and a density of at least 965 kg/m³, and from 30 to 70 wt % of a copolymer of ethylene and a $C_4$-$C_8$ alpha-olefin (B) having a melt index $MI_5$ of 0.001-2 g/10 min and a density of 910 to 945 kg/m³, wherein the composition wherein the composition obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that 0.23$\eta^*_{100}$+2050>G' (G"=3000)>0.23$\eta^*_{100}$+q, where q is 680, preferably 1020, more preferably 1350 and most preferably 1600, and also G'(G"=3000)>−0.43 $\eta^*_{100}$+2900, but preferably subject to the proviso that G'(G"=3000)<2650.

Preferably the composition has a melt storage modulus G', measured in Pa and at a dynamic frequency where the loss modulus G"=3000 Pa, of no more than 2650 Pa.

Whilst the films of the invention are usually comprised entirely of the above-defined compositions, the invention includes within its scope films comprising a blend of compositions, of which one is as defined above. Preferably at least 50 wt % of the film comprises one of the above-defined resins.

Storage modulus G' (at a loss modulus G" of 3000 Pa), also referred as G'(G"=3000), which is linked to the molecular weight distribution of the resin, affects the melt elasticity and melt strength of a molten film during blown film extrusion; a high G' corresponds to a high melt strength. This is desirable for film blowing, as a high melt strength gives improved bubble stability. The magnitude of the dynamic complex viscosity at an applied oscillating frequency, ω, of 100 rad/s, $\eta^*_{100}$, which is linked to the molecular weight of the polymer, is the viscosity at shear rates of the order typically experienced during extrusion processes, and affects extruder motor power consumption, melt pressure generation at the die etc; a low $\eta^*_{100}$ is desirable. Thus is can be seen that G' and $\eta^*_{100}$ are important for the performance of a resin in blown film production. In particular, a higher value of G' at a given $\eta^*_{100}$ provides improved bubble stability during blowing of the film, and consequently leads to improved film properties. For this reason the films of the invention have improved properties compared with similar prior art compositions. The measurement of G' and G" is described below in connection with the Examples.

For the purposes of the present invention, the term "homopolymer", as in ethylene homopolymer (A) of the preferred embodiment of the invention, is understood to denote an ethylene polymer composed essentially of monomer units derived from ethylene and substantially devoid of monomer units derived from other olefins. The term "copolymer of ethylene and a $C_4$-$C_8$ alpha-olefin" is understood to denote a copolymer comprising monomer units derived from ethylene and monomer units derived from a $C_4$-$C_8$ alpha-olefin and, optionally, from at least one other .alpha.-olefin. The $C_4$-$C_8$ alpha-olefin can be selected from olefinically unsaturated monomers comprising from 4 to 8 carbon atoms, such as, for example, 1-butene, 1-pentene, 3-methyl-1-butene, 3- and 4-methyl-1-pentenes and 1-octene. Preferred alpha-olefins are 1-butene, 1-hexene and 1-octene and more particularly 1-hexene. The other alpha-olefin which may also be present additional to the $C_4$-$C_8$ alpha-olefin is preferably selected from olefinically unsaturated monomers comprising from 3 to 8 carbon atoms, such as, for example, propylene, 1-butene, 1-pentene, 3-methyl-1-butene, 3- and 4-methyl-1-pentenes, 1-hexene and 1-octene.

The content in copolymer (B) of monomer units derived from $C_4$-$C_8$ alpha-olefin, hereinafter called comonomer content, is generally at least 0.2 mole %, in particular at least 0.4 mole %. The comonomer content of copolymer (B) is usually at most 1.8 mole %, preferably at most 1.5 mole %. Particularly preferred is a comonomer content that is between 0.5 and 1.1 mole %. When the comonomer is 1-hexene, the content measured in mole % is approximately one third that measured in weight %.

For the purposes of the present invention, the $C_4$-$C_8$ alpha-olefin content of the copolymer (B) is measured by $^{13}C$ NMR according to the method described in J. C. Randall, JMS-Rev. Macromol. Chem. Phys., C29(2&3), p. 201-317 (1989), that is to say that the content of units derived from $C_4$-$C_8$ alpha-olefin is calculated from the measurements of the integrals of the lines characteristic of that particular $C_4$-$C_8$ alpha-olefin in comparison with the integral of the line characteristic of the units derived from ethylene (30 ppm). A copolymer (3) composed essentially of monomer units derived from ethylene and a single $C_4$-$C_8$ alpha-olefin is particularly preferred.

For the purposes of the present invention, melt flow index $MI_2$, respectively $MI_5$, is understood to denote the melt flow indices measured according to ISO Standard 1133 at a temperature of 190° C. under a load of 2.16 kg, respectively 5 kg. Furthermore, melt flow index HLMI is understood to denote the melt flow index measured according to ISO Standard 1133 at a temperature of 190° C. under a load of 21.6 kg.

In the preferred aspect of the invention, homopolymer (A) preferably exhibits an $MI_2$ of at least 50 g/10 min, more preferably at least 90 g/10 min. The $MI_2$ of the homopolymer (A) preferably does not exceed 700 g/10 min.

The melt flow index $MI_5$ of the copolymer (B) is preferably at least 0.001 g/10 min. It preferably does not exceed 1.0 g/10 min. The copolymer (B) advantageously exhibits an HLMI of at least 0.05 g/10 min which, furthermore, does not exceed 20 g/10 min.

In the most preferred aspect of the invention, the film is formed from a composition capable of being obtained by a process in which:

in a first reactor, ethylene is polymerized in suspension in a first mixture comprising a diluent, hydrogen, a catalyst based on a transition metal and a cocatalyst, so as to form from 30 to 70% by weight with respect to the total weight of the composition of an ethylene homopolymer (A);

said first mixture is withdrawn from said reactor and is subjected to a reduction in pressure, so as to degas at least a portion of the hydrogen to form an at least partially degassed mixture, and said at least partially degassed mixture, together with ethylene and a $C_4$-$C_8$ alpha-olefin and, optionally, at least one other alpha.-olefin, are introduced into a subsequent reactor and the suspension polymerization is carried out therein in order to form from 30 to 70% by weight, with respect to the total weight of the composition, of a copolymer of ethylene and of $C_4$-$C_8$ alpha-olefin.

The invention also provides a process for obtaining a polyethylene resin composition, comprising the steps of polymerising ethylene and optionally comonomer, and then compounding the polyethylene composition to form it into pellets. The catalyst employed in the polymerisation process may be any catalyst(s) suitable for preparing the low and high density fractions. Preferably, the same catalyst produces both the high and low molecular weight fractions. For example, the catalyst may be a chromium catalyst, a Ziegler-Natta catalyst, or a metallocene catalyst. Preferably the catalyst is a Ziegler-Natta catalyst.

The preferred multimodal polyethylene resin composition which comprises from 30 to 70 wt % of an ethylene homopolymer (A) having a melt index $MI_2$ of 5-1000 g/10 min and a density of at least 965 kg/m$^3$, and from 30 to 70 wt % of a copolymer of ethylene and a $C_4$-$C_8$ alpha-olefin (B) having a melt index $MI_5$ of 0.001-2 g/10 min and a density of 910-945 kg/m$^3$, is preferably obtained by a process in which:

in a first reactor, ethylene is polymerised in suspension in a first mixture comprising a diluent, hydrogen, a polymerisation catalyst and a cocatalyst, so as to form from 30 to 70% by weight with respect to the total weight of the composition of ethylene homopolymer (A), said mixture is withdrawn from said reactor and is subjected to a reduction in pressure, so as to degas at least a portion of the hydrogen to form an at least partially degassed mixture, then said at least partially degassed mixture, together with ethylene and a $C_4$-$C_8$ alpha-olefin and, optionally, at least one other alpha-olefin, are introduced into a subsequent reactor and the suspension polymerization is carried out therein in order to form from 30 to 70% by weight, with respect to the total weight of the composition, of a copolymer of ethylene and of $C_4$-$C_8$ alpha-olefin (B).

Preferably the polymerisation catalyst is a mixed alcoholate catalyst containing 5 to 30% by weight of transition metal, 0.5 to 20% by weight of magnesium, 20 to 60% by weight of chlorine and 0.1 to 10% by weight of aluminium, and having a residual organic radical content in the precipitated catalyst of less than 35 wt %.

Preferably the process of the invention comprises the further step of compounding the resin formed into pellets. It is also preferred that the process of the invention comprises the further step of forming the resin created by the process into film.

"Residual organic radical content" is defined as 100 less the amount in wt % of transition metal, magnesium, aluminium and chlorine as determined by X-ray fluorescence. This is a convenient measure of the effective chlorination ratio in the catalyst: we have found that this has a significant influence on the molecular weight distribution of the polymer made using the catalyst, which is believed to affect the properties of films made from the polymer.

Suspension polymerization is understood to denote the polymerization in a diluent which is in the liquid state under the polymerization conditions (temperature, pressure) used, these polymerization conditions or the diluent being such that at least 50% by weight (preferably at least 70%) of the polymer formed is insoluble in the said diluent.

The diluent used in the polymerization process according to the invention is usually a hydrocarbon-comprising diluent which is inert with respect to the catalyst, the cocatalyst and the polymer formed, such as, for example, a linear or branched alkane or a cycloalkane having from 3 to 8 carbon atoms, such as hexane or isobutane. The amount of ethylene introduced into the first polymerization reactor and into the subsequent polymerization reactor is generally adjusted so as to obtain a concentration of ethylene in the diluent of 5 to 50 g of ethylene per kg of diluent.

The amount of hydrogen introduced into the first reactor is generally adjusted so as to obtain, in the diluent, a molar ratio of hydrogen to ethylene of 0.05 to 1. In the first reactor, this molar ratio is preferably at least 0.1. A hydrogen/ethylene molar ratio which does not exceed 0.6 is particularly preferred.

The mixture withdrawn from the first reactor, additionally comprising the homopolymer (A), is subjected to a reduction in pressure so as to remove (degas) at least a portion of the hydrogen. The reduction in pressure is advantageously carried out at a temperature of less than or equal to the polymerization temperature in the first reactor. The temperature at which the reduction in pressure is carried out is usually greater than 20° C.; it is preferably at least 40° C. The pressure at which the reduction in pressure is carried out is less than the pressure in the first reactor. The pressure-reduction pressure is preferably less than 1.5 MPa. The pressure-reduction pressure is usually at least 0.1 MPa. The amount of hydrogen still present in the at least partially degassed mixture is generally less than 1% by weight of the amount of hydrogen initially present in the mixture withdrawn from the first polymerization reactor; this amount is preferably less than 0.5%. The amount of hydrogen present in the partially degassed mixture introduced into the subsequent polymerization reactor is consequently low, or even zero. The subsequent reactor is preferably also fed with hydrogen. The amount of hydrogen introduced into the subsequent reactor is generally adjusted so as to obtain, in the diluent, a molar ratio of hydrogen to ethylene of 0.001 to 0.1. This molar ratio is preferably at least 0.004 in this subsequent reactor. It preferably does not exceed 0.05. In the process according to the invention, the ratio of the concentration of hydrogen in the diluent in the first reactor to the concentration in the subsequent polymerization reactor is usually at least 20, preferably at least 30. A ratio of concentrations of at least 40 is particularly preferred. This ratio usually does not exceed 300, preferably not 200.

The amount of $C_4$-$C_8$ alpha-olefin introduced into the subsequent polymerization reactor is such that, in this reactor, the $C_4$-$C_8$ alpha-olefin/ethylene molar ratio in the diluent is at least 0.05, preferably at least 0.1, but preferably does not exceed 3, and more preferably no higher than 2.8. In the preferred process according to the invention, the first reactor is not fed with $C_4$-$C_8$ alpha-olefin, such that the first reactor is essentially devoid of $C_4$-$C_8$ alpha-olefin. In this case, the diluent introduced into the first reactor, which can be recycled diluent, must be highly depleted in $C_4$-$C_8$ alpha-olefin. The diluent introduced into the first reactor preferably contains less than 1000 ppm of $C_4$-$C_8$ alpha-olefin, and most preferably is essentially free of $C_4$-$C_8$ alpha-olefin.

The preferred catalyst used to make the compositions of the invention comprises at least one transition metal. Transition metal is understood to denote a metal from Groups 4, 5 or 6 of the Periodic Table of the Elements (CRC Handbook of Chemistry and Physics, 75th edition, 1994-95). The transition metal is preferably titanium and/or zirconium. Titanium is particularly preferred. In the process according to the invention, use is preferably made of a catalyst comprising, in addition to the transition metal, magnesium.

These catalysts are preferably obtained by coprecipitation of at least one transition metal compound and of a magnesium compound by means of a halogenated organoaluminium compound. Such catalysts are known; they have been disclosed particularly in U.S. Pat. Nos. 3,901,863, 4,929,200 and 4,617,360 (Solvay). In the process according to the invention, the catalyst is preferably introduced solely into the first polymerization reactor, that is to say that fresh catalyst is not introduced into the subsequent polymerization reactor. The amount of catalyst introduced into the first reactor is generally adjusted so as to obtain an amount of at least 0.5 mg of transition metal per liter of diluent. The amount of catalyst usually does not exceed 100 mg of transition metal per liter of diluent.

These catalysts typically contain 5 to 30% by weight of transition metal, 0.5 to 20% by weight of magnesium, 20 to 60% by weight of chlorine and 0.1 to 10% by weight of aluminium, and have a residual organic radical content in the precipitated catalyst of less than 35 wt %. These catalysts are also obtained by coprecipitation of at least one transition metal compound and a magnesium compound by means of a halogenated organoaluminium compound, but with a ratio of transition metal to magnesium of no more than about 1:1. They are described in more detail in our own EP 703247B. Most preferred catalysts have the following composition:
 Transition metal from 8 to 16% by weight
 Magnesium content from 5 to 15% by weight
 Chlorine content from 40 to 60% by weight
 Aluminum content less than 5% by weight
 Residual organic content less than 35% by weight
 Total alkyl benzoate content less than 20% by weight.

The cocatalyst employed is preferably an organoaluminium compound. Non-halogenated organoaluminium compounds of formula $AlR_3$ in which R represents an alkyl group having from 1 to 8 carbon atoms are preferred. Triethylaluminium and triisobutylaluminium are particularly preferred. The cocatalyst is introduced into the first polymerization reactor. It is also possible to introduce fresh cocatalyst into the subsequent reactor. The amount of cocatalyst introduced into the first reactor is generally at least $0.1 \times 10^{-3}$ mol per liter of diluent. It usually does not exceed $5 \times 10^{-3}$ mol per liter of diluent. If appropriate, the amount of fresh cocatalyst introduced into the subsequent reactor usually does not exceed $5 \times 10^{-3}$ mol per liter of diluent.

In the preferred process of the invention, the polymerization temperature is generally from 20 to 130° C. It is preferably at least 60° C. It preferably does not exceed 115° C. The total pressure at which the process according to the invention is carried out is generally from 0.1 MPa to 10 MPa. In the first polymerization reactor, the total pressure is preferably at least 2.5 MPa. It preferably does not exceed 5 MPa. In the subsequent polymerization reactor, the total pressure is preferably at least 1.3 MPa. It preferably does not exceed 4.3 MPa.

The duration of polymerization in the first reactor and in the subsequent reactor is generally at least 20 minutes, preferably at least 30 minutes. The duration of polymerization usually does not exceed 5 hours, preferably not 3 hours.

In order to carry out the preferred process of the invention, it is possible to make use of a plant comprising more than two polymerization reactors connected in series. It is preferable to restrict the system to two polymerization reactors connected in series, separated by a device which makes it possible to carry out the reduction in pressure. In the preferred process, a suspension comprising a composition comprising from 30 to 70% by weight of the homopolymer (A) and from 30 to 70% by weight of the copolymer (B) is collected at the outlet of the subsequent polymerization reactor. The composition comprising ethylene polymers can be separated from the suspension by any known means. The suspension is usually subjected to a reduction in pressure (final reduction in pressure), so as to remove the diluent, the ethylene, the $C_4$-$C_8$ alpha-olefin and, optionally, the hydrogen from the composition. According to an alternative form of the process and more particularly when the diluent is isobutane, the gases exiting from the first reduction in pressure (intermediate reduction in pressure between the two polymerization reactors) and from the final reduction in pressure are mixed, compressed and conveyed to a distillation unit. This distillation unit is advantageously composed of one or of two distillation columns in series. Ethylene and hydrogen are withdrawn at the column top, a mixture of isobutane and $C_4$-$C_8$ alpha-olefin is withdrawn at the column bottom and isobutane devoid of the $C_4$-$C_8$ alpha-olefin is withdrawn from an intermediate plate. The isobutane-alpha-olefin mixture is then recycled in the subsequent polymerization reactor, whereas the isobutane devoid of $C_4$-$C_8$ alpha-olefin is recycled in the first reactor.

Typically the compositions of the invention are compounded into pellets prior to their use in the manufacture of articles such as films. Compounding conditions are well known to those skilled in the art. The conditions may be selected to control the amount of reticulation taking place in the composition; reticulation has been found to increase the value of the storage modulus G', which has the effect of increasing the value of z and decreasing the value of y in the relationships $G'(G''=3000) \geq -0.86\eta^*_{100} + z$ and $G'(G''=3000) \geq 0.875\eta^*_{100} - y$, which define the scope of the invention. Thus reticulation may be used in order to ensure that the compositions made are within the scope of the present invention, and accordingly it is preferred that the compositions are subjected to reticulation during compounding.

As a general rule, the pelletisation of the bimodal film resins disclosed herein requires the optimisation of extrusion conditions. The correct balance between bimodal film properties such as film appearance, i.e. gels free quality, impact resistance and tear resistance, is obtained by adjustment of specific energy, residence time in the extruder and reticulation rate applied to the ethylene polymer. Such techniques are well known in the art. The compounding tool can be of twin screw extruder type optionally equipped with a melt pump to pressurize the molten product and ensure the flow through filter and dieplate; it can also be of continuous mixer type equipped with a gear pump. Specific energy applied to the polymer is generally higher than 180 kWh/t, preferably higher than 200 kWh/t and most preferably higher than 220 kWh/t. Specific energy is generally not be higher than 270 kWh/t, preferably not higher than 250 kWh/t and most preferably not higher than 230 kWh/t. Length of the extruder or mixer, number of mixing stages and gate aperture between stages are adjusted in such a way that the residence time of the molten bimodal is generally longer than 10 seconds, preferably longer than 20 seconds and most preferably longer than 30 seconds.

Reticulation of the ethylene polymer is typically accomplished using either oxygen or peroxide, as is well known in the art. Cross-linking under oxygen is controlled either by injection of oxygen at the powder feeding section, for example at the feeding throat of the extruder or mixer or by nitrogen blanketing flow adjustment at the same feeding throat. In both cases, oxygen concentration is typically controlled at lower than 15 wt %, preferably lower than 11 wt %. Cross-linking under peroxide is controlled by addition of peroxide in powder or liquid form in the pre-mix of additives fed in the extruder, simultaneously with polyethylene powder. The type of peroxide is selected according to its half time life curve versus temperature. It is desired that the peroxide should start to react in the second or the third mixing stage, by which time it is already intimately dispersed in the ethylene polymer. Desirably the peroxide action should stop at the exit of the extruder or mixer, so that its cross-linking action is not longer than the polymer extrusion residence time. Both means of reticulation, by oxygen and by peroxide, enable attainment of the melt storage modulus G' target; the higher the specific energy and the longer the residence time, the more efficient the reticulation under oxygen or peroxide. On the other hand, deterioration of bimodal film mechanical properties can occur at high values of G', equating to a substantial degree of reticulation; consequently specific energy, residence time, type and concentration of peroxide and oxygen concentration have to be closely optimized and controlled to ensure the optimum bimodal film performance.

Although the relationships between $G'(G''=3000)$ and dynamic complex viscosity $\eta^*_{100}$ defined by the present invention may be achieved without reticulation, typically the compounding conditions are selected to introduce a degree of reticulation such after compounding the value of z is greater than before compounding, and the value of y is less than before compounding. Preferably, the compounding step increases the value of z by at least 100, preferably by 400-1200, and decreases the value of y by at least 100, preferably 400-1200. The compounding conditions which achieve such an increase in the storage modulus G' are those which are conventionally used to achieve reticulation, and are well known to those skilled in the art. The level of reticulation agents including oxygen and peroxides, and the presence of additives such as phosphites, can all be adjusted so as to control the degree of reticulation and hence the increase in G'.

However, whilst an increased G' is desirable in order to improve the melt elasticity and melt strength and balanced orientation of the resin, as previously mentioned increasing G' too much during compounding can adversely affect mechanical properties such as impact performance. Hence it is preferred to maximise the G' of the resin before compounding.

Alternatively, the compositions forming the films of the invention can comprise blends of resins with a high degree of reticulation and resins with little or no reticulation. In a still further aspect of the invention, the films of the invention can comprise a blend of 20-80 wt % of a first composition, and 80-20 wt % of a second composition but where z<3800 and y>650. In such a blend the composition with the higher value of z and lower value of y is typically reticulated whereas the other composition is not.

The amount of homopolymer (A) in the composition of the invention is preferably at least 35%, more particularly at least 40%, by weight with respect to the total weight of the composition. The amount of homopolymer (A) preferably does not exceed 60% by weight. Good results have been obtained with an amount of homopolymer (A) which does not exceed 55% by weight with respect to the total weight of the composition.

The amount of copolymer (B) is preferably at least 45%, more particularly at least 50%, by weight with respect to the total weight of the composition. The amount of copolymer (B) preferably does not exceed 65% by weight. Good results have been obtained with an amount of copolymer (B) not exceeding 60% by weight with respect to the total weight of the composition.

The composition according to the invention generally comprises at least 95%, preferably at least 99%, by weight of the combination of the homopolymer (A) and of the copolymer (B). A composition comprised solely of the homopolymer (A) and of the copolymer (B) is very particularly preferred.

The composition according to the invention generally exhibits a melt flow index $MI_5$ of at least 0.07 g/10 min, preferably of at least 0.1 g/10 min. The $MI_5$ of the composition usually does not exceed 10 g/10 min, preferably not 7 g/10 min. Compositions for which the $MI_5$ does not exceed 1 g/10 min are particularly preferred. The composition according to the invention advantageously exhibits an HLMI of at least 2 g/10 min which, furthermore, does not exceed 100 g/10 min, and preferably no more than 25 g/10 min.

The compositions according to the invention generally exhibit a standard density SD, measured according to ISO Standard 1183-1 (on a sample prepared according to ISO Standard 293) of at least 930 kg/m$^3$. The compositions preferably exhibit an SD of greater than 935 kg/m$^3$. Compositions which have given good results are those for which the SD is at least equal to 940 kg/m$^3$. The SD generally does not exceed 965 kg/m$^3$; it preferably does not exceed 960 kg/m$^3$. Compositions for which the SD is less than 955 kg/m$^3$ are particularly preferred. The SD of the homopolymer (A) present in the compositions according to the invention is generally at least 960 kg/m$^3$, preferably at least 965 kg/m$^3$. A homopolymer (A) having an SD of at least 968 kg/m$^3$ is very particularly preferred. The SD of the copolymer (B) is generally from 910 to 945 kg/m$^3$. The SD of the copolymer (B) is preferably at least 915 kg/m$^3$. The SD of the copolymer (3) preferably does not exceed 940 kg/m$^3$, and more particularly it does not exceed 938 kg/m$^3$.

As well as the manufacture of films, the compositions of the invention may be used, inter alia, in extrusion processes such as extrusion coating, blow-moulding, injection-moulding or thermoforming. They may be used for the manufacture of articles such as sheets, containers and bags.

The compositions made according to the invention can be mixed with the usual processing additives for polyolefins, such as stabilizers (antioxidizing agents and/or anti-UV agents), antistatic agents and processing aids, as well as pigments. The invention consequently also relates to a mixture comprising a composition according to the invention and at least one of the additives described above. The mixtures comprising at least 95%, preferably at least 97%, by weight of a composition according to the invention and at least one of the additives described above are particularly preferred.

The Examples which follow are intended to illustrate the invention, together with FIG. 1 of the drawings, which shows the relationship of the Examples to the equations relating G'(G"=3000) and $\eta^*_{100}$ as specified in the invention

EXAMPLES

The meanings of the symbols used in these examples and the units expressing the properties mentioned and the methods for measuring these properties are explained below.

Elmendorf Tear Resistance=resistance to tearing measured according to ASTM Standard D 1922-67; MD denotes the measurement in the longitudinal (machine) direction of the film, TD denotes the measurement in the transverse direction of the film.

DDT=Dart prop Test, impact strength or resistance to perforation measured according to ASTM D1709. The values have been expressed in g per each thickness of the film in μm tested (i.e., either 15 μm thick films in Table 4 or 25 μm thick films in Table 5).

Dynamic Rheological Analysis

Rheological measurements were carried out on an oscillatory rheometer (e.g., Rheometrics RDS-2, ARES) with 25 mm diameter parallel plates in a dynamic mode, under an inert atmosphere (nitrogen). For all experiments, the rheometer was thermally stable at 190° C. for at least 30 minutes before inserting the appropriately stabilised (with anti-oxidant additives), compression-moulded sample of resin onto the parallel plates. The plates were then closed with a positive normal force registered on the meter to ensure good contact. After about 5 minutes at 190° C., the plates were lightly compressed and the surplus polymer at the circumference of the plates trimmed. A further 10 minutes was allowed for thermal stability and for the normal force to decrease back to zero.

Two strain sweep (SS) experiments were initially carried out at 190° C. under nitrogen to determine the linear viscoelastic strain that would generate a torque signal which is greater than 10% of the lower scale of the transducer, over the full frequency (e.g. 0.01 to 100 rad/s) range. The first SS experiment was carried out with a low applied frequency of 0.1 rad/s so as to determine the sensitivity of the torque at low frequency. The second SS experiment was carried out with a high applied frequency of 100 rad/s to ensure that the selected applied strain is well within the linear viscoelastic region of the polymer so that the oscillatory rheological measurements do not induce structural changes to the polymer during testing. In addition, a time sweep (TS) experiment was carried out with a low applied frequency of 0.1 rad/s at the selected strain (as determined by the SS experiments) to check the stability of the sample during testing.

Measurement of Melt Elastic Modulus G'(G"=3000 Pa) and Complex Dynamic Shear Viscosity, $\eta^*(100)$, at 190° C.

The frequency sweep (FS) experiment was then carried out at 190° C. using the above appropriately selected strain level between dynamic frequencies range of $10^{-2}$ to 100 rad/s, under nitrogen. The dynamic rheological data thus measured were then analysed using the rheometer software (viz., Rheometrics RHIOS V4.4 or Orchestrator Software) to determine the melt elastic modulus G'(G"-=3000 Pa) at a reference melt viscous modulus (G") value of G"=3000 Pa. If necessary, the values were obtained by interpolation between the available data points using the Rheometrics software.

The complex dynamic shear viscosity, $\eta^*(100)$ in units of Pa·s, at dynamic frequency of 100 rad/s, was determined directly from the $\eta^*$ data of the frequency sweep (FS) experiment measured at 190° C.

The term "Storage modulus", G'(ω), also known as "elastic modulus", which is a function of the applied oscillating frequency, ω, is defined as the stress in phase with the strain in a sinusoidal deformation divided by the strain; while the term "Viscous modulus", G"(ω), also known as "loss modulus", which is also a function of the applied oscillating frequency, ω, is defined as the stress 90 degrees out of phase with the strain divided by the strain. Both these moduli, and the others linear viscoelastic, dynamic Theological parameters, are well known within the skill in the art, for example, as discussed by G. Marin in "Oscillatory Rheometry", Chapter 10 of the book on Rheological Measurement, edited by A. A. Collyer and D. W. Clegg, Elsevier, 1988.

A) Catalyst

Catalyst (I)

Magnesium diethoxide was reacted with titanium tetrabutoxide for 7 hours at 140±5° C. in an amount such that the molar ratio of titanium to magnesium was equal to 1. The reaction product thus obtained (mixed alcoholate) was subsequently contacted with ethylbenzoate (EB) at ambient temperature for at least 6 hours. The mixture of mixed alcoholate and ethyl benzoate was then reacted with aluminium isobutyl dichloride (IBADIC), in two steps. The first step was performed at 45° C., the second step at 45° C. The amount of IBADIC introduced at the end of the first step corresponded to a IBADIC/Mg ratio of 4.5 mole/mole. A partial elimination of the chlorination by-products was effected by decantation of the solid and removal of the supernatant liquid. The amount of IBADIC introduced at the end of the second chlorination step corresponded to a IBADIC/Mg ratio of 2.5 mole/mole. After the second chlorination step, the slurry was aged at 60° C. for 45 minutes, and subsequently cooled at ambient temperature (less than 35° C.). The reaction by-products were then removed from the slurry by washing the solid with polymerisation grade hexane. The catalyst thus obtained, collected from the suspension, comprised (% by weight): Ti: 13; Cl: 51; Al: 2; Mg: 7. The concentration of total benzoates in the catalyst was about 10 wt %.

Catalyst (II)

Magnesium diethoxide was reacted with titanium tetrabutoxide for 4 hours at 140° C. in an amount such that the molar ratio of titanium to magnesium was equal to 1. The reaction product thus obtained was subsequently chlorinated and precipitated by bringing the latter into contact with an ethylaluminium dichloride solution (EADC) for 90 minutes at 45° C. The EADC/Mg ratio was 6.5 mole/mole. The obtained slurry was subsequently aged at 60° C. for 45 minutes, and then cooled at ambient temperature (<35° C.). The by-products from the chlorination reaction were removed from the slurry by washing the solid with polymerisation grade hexane at ambient temperature. The catalyst thus obtained, collected from the suspension, comprised (% by weight): Ti: 17; Cl: 41; Al: 2; Mg: 5.

B) Composition

The manufacture of a composition comprising ethylene polymers was carried out in suspension in isobutane in two loop reactors connected in series and separated by a device which makes it possible continuously to carry out the reduction in pressure.

Isobutane, ethylene, hydrogen, triethylaluminium and one of the catalysts (I) or (II) above were continuously introduced into the first loop reactor and the polymerization of ethylene was carried out in this mixture in order to form the homopolymer (A). This mixture, additionally comprising the homopolymer (A), was continuously withdrawn from the said reactor and was subjected to a reduction in pressure (~50° C., 0.6 MPa), so as to remove at least a portion of the hydrogen. The resulting mixture, at least partially degassed of hydrogen, was then continuously introduced into a second polymerization reactor, at the same time as ethylene, hexene, isobutane and hydrogen, and the polymerization of the ethylene and of the hexene was carried out therein in order to form the ethylene/1-hexene copolymer (B). The suspension comprising the composition comprising ethylene polymers was continuously withdrawn from the second reactor and this suspension was subjected to a final reduction in pressure, so as to evaporate the isobutane and the reactants present (ethylene, hexene and hydrogen) and to recover the composition in the form of a powder, which was subjected to drying in order to complete the degassing of the isobutane.

The other polymerisation conditions are specified in Table 1. The properties of the compositions are presented in Table 2.

The properties of the compositions are presented in Table 2. Compositions A, B and 2-7 were made into pellet form using a pilot plant scale extrusion line capable of making a homogeneous blend of the ethylene polymers (A) and (B). The extruder used was a Kobe LCM50G twin rotor, counter-rotating extruder equipped with a 37 kW motor, KN-001 gear pump and underwater pelletizer. Powder and additive concentrate were fed with two separate loss in weight twin screw feeders. The extruder was operated at an output between 50 and 80 kg/h, 800 rpm screw speed, 0.8 bar gear pump suction pressure, 180-230 kWh/t specific energy and 240-270° C. melt temperature. During this process stabilisers were added and a flow of nitrogen gas or a mixture of oxygen diluted in nitrogen was introduced at the feeders and the extruder inlet hopper in so as to control the amount of air carried forward with the composition into the extruder itself. The oxygen level measured in the extruder hopper was maintained at 9-11 wt %, thus causing reticulation to take place.

The composition of Example C in powder form was made into pellet form using a Kobe LCM100H extruder with gear pump under the following conditions; 500 kg/h throughput, 470 rpm screw speed, closed gate @ 1.25 mm, 0.8 bar gear pump suction pressure, 220-225 kWh/t, 255-260° C. melt temperature. During this process stabilisers were added and a flow of nitrogen gas was introduced at various points of the extruder (mainly at the feed hopper) in order to minimise the amount of air carried forward with the composition into the extruder itself. The oxygen level measured in the extruder hopper was kept below 0.1 wt %, thereby ensuring that essentially no reticulation took place. The properties of unreticulated Example C are shown in Table 5.

A further sample of the composition of Example C in powder form was also made into pellet form using a Kobe LCM100H extruder under the following conditions; 500 kg/h throughput, 470 rpm screw speed, closed gate @ 1.25 mm, 0.8 bar gear pump suction pressure, 220-225 kWh/t specific energy, 255-260° C. melt temperature. During this process stabilisers were added and a flow of nitrogen gas was introduced at various points of the extruder (mainly at the feed hopper) in such a manner to control the amount of air carried forward with the composition into the extruder itself. The oxygen level measured in the extruder hopper was maintained at 9-11 wt %, thus causing reticulation to take place. The properties of reticulated Example C1 are shown in Table 5.

A new Example C2 (also shown in Table 5) was made by making a physical blend of 50 wt % of the unreticulated Example C and 50 wt % of the reticulated Example C1 using a tumble mixing device.

Figure 1:
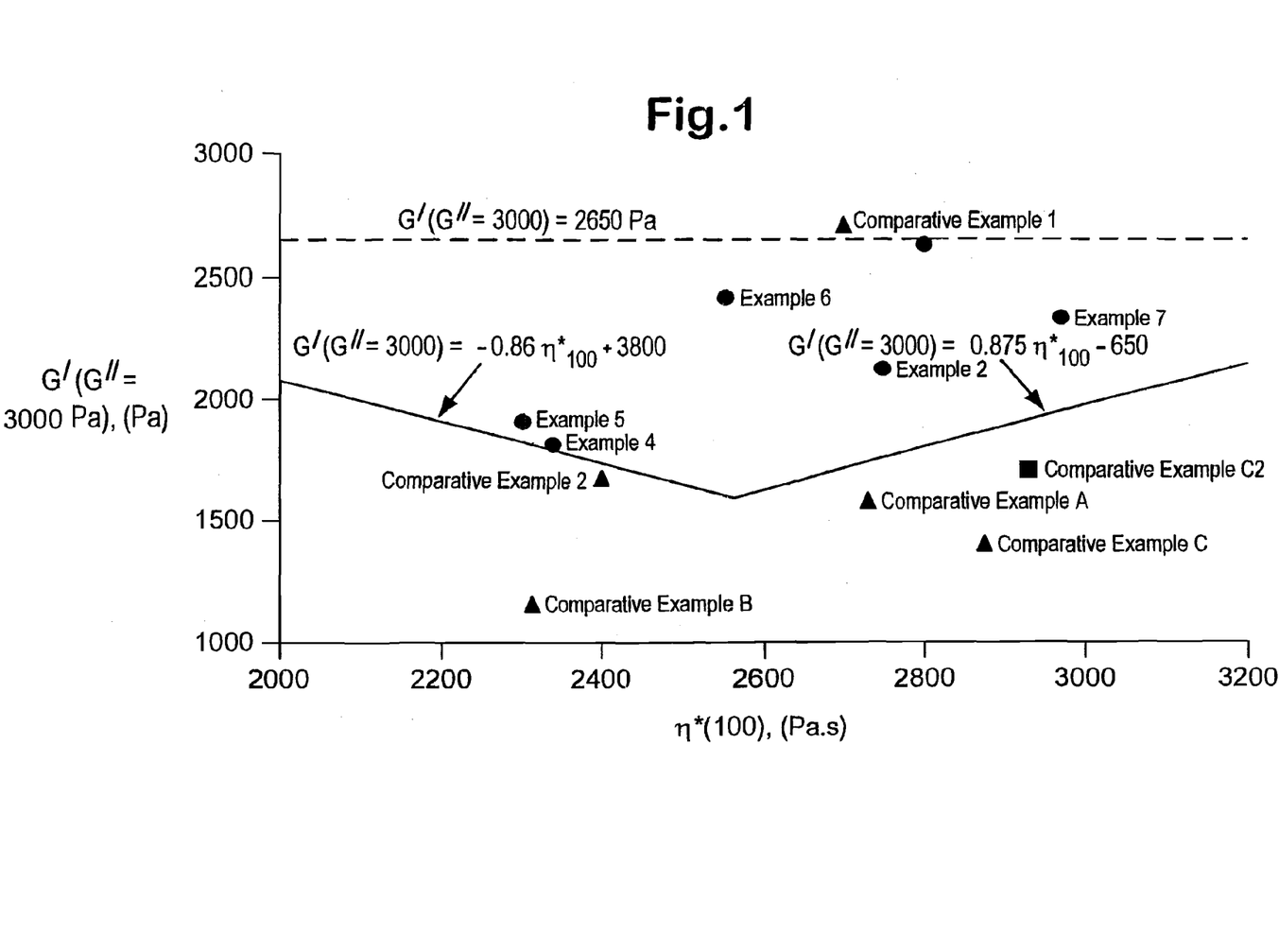

Dynamic rheology analyses were performed on all these compositions in pellet form to determine their melt elastic modulus $G'(G''=3000$ Pa$)$ and their complex dynamic shear viscosity, $\eta^*(100)$, at 190° C. These results are shown in Tables 3, 4 and 5. From this data it can be seen that Comparative Examples A, B, C and C2 fall outside the scope of the invention as defined by the two equations $G'(G''=3000)>-0.86\eta^*_{100}+3800$ and $G'(G''=3000)>0.875\eta^*_{100}-650$. Examples 2-7 are inside the scope of the invention, as is Example C1 (a reticulated version of Example C). This is shown in FIG. 1.

C) Film

The compositions of the above Examples were blown into films where possible.

Film Extrusion/Blowing

Films were blown on a Kiefel Rotex 40SA line of the following description:

Extruder:
   Manufacturer: KIEFEL Extrusion GmbH, Germany
   Type: Rotex 40SA
   Power: 25 kW
Screw:
   Manufacturer: KIEFEL Extrusion GmbH, Germany
   Type: 24D Standard
   Diameter (D): 40 mm
   Length (L) to diameter (D): 24/1
   Speed:
      Maximum=275 min$^{-1}$
      Standard=100 min$^{-1}$
      Output at Standard speed=30 kg h$^{-1}$.
Die:
   Manufacturer: KIEFEL Extrusion GmbH, Germany
   Diameter: 100 mm
   Gap: 1.2 mm The extrusion conditions were as follows:
Extruder Temperatures Profile (° C.):
    Screw Zone 1: 190°
    Zone 2: 190°
    Die Zone 3: 190°
    Zone 4: 200°
    Zone 5: 210°
    Screen Pack: HD type.
Output:
    Screw Speed: 90-100 rpm
    Output: 30 kg h$^{-1}$ Five types of films, i-v, were made using the above conditions (same extruder temperature profile, output and film thickness) each having different blown up ratio (BUR) and neck height:

|  | Film | | | | |
|---|---|---|---|---|---|
|  | i | ii | iii | iv | v |
| Thickness (μm) | 15 | 15 | 15 | 15 | 25 |
| Blown up Ratio (BUR) | 5:1 | 5:1 | 3:1 | 3:1 | 4:1 |
| Neck Height | 8 × D | 5 × D | 8 × D | 5 × D | 6 × D |

D = die diameter (mm)

The number of amps required for the extruder, its pressure and temperatures were recorded, together with the winding (take-off speed) for each film extrusion, if desired.

Determination of Bubble Stability

The stability of the bubble during each film extrusion process was rated, on a scale of 1 (worst) to 5 (best), for helical instability, bubble diameter oscillation and vertical bubble instability. Helical instability involves decreases in diameter in a helical pattern around the bubble (Bubble is "snaking" from side to side) while bubble diameter (or BUR) oscillation involves alternating larger and smaller diameters. Vertical bubble instability involves the cyclic variation of neck heights ("bouncing").

Bubble Stability Rating
    5—Good bubble stability.
    4—Bubble moves lightly from side to side (chatter), but no effects on the film thickness
    3—Bubble moves from side to side (chatter) with some effects on the film thickness
    2—Bubble is "snaking" from side to side (helical instability) with a significant effect on the film thickness
    1—BUR and Neck height ("bouncing") varies cyclically (Bubble diameter and vertical instabilities).

Samples of the films made from above examples were conditioned for 48 hours at 20-25° C. and their Dart Drop Impacting Testing (DDT), according to ASTM D 1709, and Elmendorf Tear Resistance, according to ASTM D1922, were measured.

Film properties for the Examples, except Examples C, C1 and C2, are shown in Table 4, together with the properties of two commercial films (Comparative Examples 1 and 2). Comparative Examples 1 and 2 are resins which are currently commercially available.

Properties of the films made from Examples C, C1 and C2 are shown in Table 5. It should be noted that the DDT test in Table 5 is on samples of 25 μm thick (film type v) rather than 15 μm thick (as in Table 4 for film types i-iv), and is measured also in g.

TABLE 1

| | polymerisation conditions Examples A-C are comparative | | | | | | | |
|---|---|---|---|---|---|---|---|---|
| | EXAMPLE | | | | | | | |
| Catalyst | A<br>I | B<br>II | C<br>I | 2<br>I | 4<br>II | 5<br>II | 6<br>II | 7<br>II |
| | Reactor I | | | | | | | |
| C2 (g/kg) | 16.1 | 23.2 | 18.4 | 16.1 | 20.1 | 23.2 | 20.1 | 15.0 |
| H2/C2 (mole/mole) | 0.470 | 0.43 | 0.452 | 0.470 | 0.42 | 0.43 | 0.42 | 0.35 |
| T (° C.) | 90 | 85 | 90 | 90 | 85 | 85 | 85 | 90 |
| Residence time (h) | 1.61 | 1.6 | 1.58 | 1.61 | 1.63 | 1.6 | 1.63 | 1.61 |
| | Reactor II | | | | | | | |
| C2 (g/kg) | 12.3 | 31.1 | 16.6 | 12.3 | 23.1 | 31.1 | 23.1 | 38.9 |
| C6/C2 (mole/mole) | 1.28 | 1.13 | 0.974 | 1.28 | 1.22 | 1.13 | 1.22 | 1.99 |
| H2/C2 (mole/mole) | 0.0054 | 0.0068 | 0.0049 | 0.0054 | 0.006 | 0.0068 | 0.006 | 0.0031 |
| T (° C.) | 80 | 75 | 85 | 80 | 75 | 75 | 75 | 80 |
| Residence time (h) | 1.38 | 1.39 | 1.34 | 1.38 | 1.42 | 1.39 | 1.42 | 1.41 |

TABLE 2

| | polymer properties | | | | | | | |
|---|---|---|---|---|---|---|---|---|
| | EXAMPLE | | | | | | | |
| Catalyst | A<br>(Comp)<br>I | B<br>(Comp)<br>II | C<br>(Comp)<br>I | 2<br>I | 4<br>II | 5<br>II | 6<br>II | 7<br>II |
| | Component A | | | | | | | |
| wt % A | 45 | 46 | 45 | 45 | 46 | 45 | 46 | 45 |
| MI$_2$ (A) | 190 | 250 Al:Mg | 167 | 190 | 240 | 190 | 240 | 184 |
| Density A (kg/m$^3$) | 971 | 972 | 971 | 971 | 972.6 | 971 | 972.6 | 971 |

TABLE 2-continued polymer properties

| | EXAMPLE | | | | | | | |
|---|---|---|---|---|---|---|---|---|
| | A (Comp) | B (Comp) | C (Comp) | 2 | 4 | 5 | 6 | 7 |
| Catalyst | I | II | I | I | II | II | II | II |
| Component B | | | | | | | | |
| MI$_5$ (g/10 min) | 0.01 | 0.04 | 0.02 | 0.01 | 0.03 | 0.01 | 0.03 | 0.02 |
| Density B | 925 | 931 | | 925 | 930 | 925 | 930 | 927 |
| Final resin | | | | | | | | |
| C6 content (wt %) | 1.1 | 0.5 | | 1.1 | 0.6 | 1.1 | 0.6 | 1.1 |
| MI$_5$ (g/10 min) | 0.17 | 0.38 | 0.18 | 0.17 | 0.26 | 0.17 | 0.26 | 0.15 |
| HLMI (g/10 min) | 6.0 | 8.8 | 4.7 | 6.0 | 6.7 | 6.0 | 6.7 | 3.8 |
| Density (kg/m$^3$) | 949 | 953.6 | 949 | 949 | 952.8 | 949 | 952.8 | 951 |

TABLE 3

Compounding conditions and properties of compounded pellets

| | | Example | | | | | | |
|---|---|---|---|---|---|---|---|---|
| Compounding conditions | Units | A comp | B comp | 2 | 4 | 5 | 6 | 7 |
| Nitrogen protection | | yes | yes | | | | | |
| Oxygen amount | % | | | 10 | 10 | 10 | | 10 |
| * DHBP 7.5 IC5 | ppm | | | | | | 850 | |
| Output | kg/h | 75 | 50 | 75 | 50 | 50 | 50 | 75 |
| Screw speed | rpm | 800 | 800 | 800 | 800 | 800 | 800 | 800 |
| Gear pump suction pressure | Bar | 0.8 | 0.8 | 0.8 | 0.8 | 0.8 | 0.8 | 0.8 |
| Melt temperature | °C. | 261 | 255 | 262 | 255 | 254 | 257 | 266 |
| Specific energy | kWh/t | 0.186 | 0.189 | 0.186 | 0.193 | 0.190 | 0.197 | 0.198 |
| MI$_5$ | g/10 min | 0.17 | 0.38 | 0.16 | 0.26 | 0.30 | 0.18 | 0.15 |
| η*$_{100}$ | Pa s | 2730 | 2310 | 2750 | 2340 | 2300 | 2555 | 2970 |
| G'(G" = 3000 Pa) | Pa | 1580 | 1160 | 2125 | 1810 | 1900 | 2420 | 2335 |

* DHBP 7.5 IC 5 = 2,5-Dimethyl-2,5-di (tert.butylperoxy) hexane, a trade designation of commercially available product from Degussa Peroxygen Chemicals.

TABLE 4

Film properties

| | | Example | | | | | | | Comp. 1 | Comp. 2 |
|---|---|---|---|---|---|---|---|---|---|---|
| | Units | A comp | B comp | 2 | 4 | 5 | 6 | 7 | | |
| Composition after pelletisation | | | | | | | | | | |
| MI$_5$ | g/10 min | 0.17 | 0.38 | 0.16 | 0.26 | 0.30 | 0.18 | 0.15 | 0.15 | 0.22 |
| η*$_{100}$ | Pa s | 2730 | 2310 | 2750 | 2340 | 2300 | 2555 | 2970 | 2700 | 2400 |
| G'(G" = 3000 Pa) | Pa | 1580 | 1160 | 2125 | 1810 | 1900 | 2420 | 2335 | 2705 | 1670 |
| Film properties | | | | | | | | | | |
| Film thickness | Microns (μm) | 15 | 15 | 15 | 15 | 15 | 15 | 15 | 15 | 15 |
| Blowing condition: Blow Up Ratio = 5:1 - Neck Height = 8 × D | | | | | | | | | | |
| Impact | g | * | * | 534 | 466 | 372 | 296 | 268 | 110 | 405 |
| Elmendorf Tear MD | g | * | * | 90 | 39 | 29 | 39 | 115 | 56 | 23 |
| Elmendorf Tear TD | g | * | * | 93 | 111 | 124 | 37 | 50 | 25 | 39 |

TABLE 4-continued

Film properties

| | Units | Example A comp | B comp | 2 | 4 | 5 | 6 | 7 | Comp. 1 | Comp. 2 |
|---|---|---|---|---|---|---|---|---|---|---|
| Tear ratio (=TD/MD) | — | * | * | 1 | 2.8 | 4.3 | 0.95 | 0.43 | 0.44 | 1.7 |

Blowing condition: Blow Up Ratio = 5:1 - Neck Height = 8 × D

| | Units | A comp | B comp | 2 | 4 | 5 | 6 | 7 | Comp. 1 | Comp. 2 |
|---|---|---|---|---|---|---|---|---|---|---|
| Impact | g | * | * | 560 | | | | 511 | 144 | 379 |
| Elmendorf Tear MD | g | * | * | 49 | | | | 56 | 33 | 14 |
| Elmendorf Tear TD | g | * | * | 195 | | | | 121 | 66 | 152 |
| Tear ratio (=TD/MD) | — | * | * | 4 | | | | 2.2 | 2 | 10.9 |

Blowing condition: Blow Up Ratio = 3:1 - Neck Height = 8 × D

| | Units | A comp | B comp | 2 | 4 | 5 | 6 | 7 | Comp. 1 | Comp. 2 |
|---|---|---|---|---|---|---|---|---|---|---|
| Impact | g | * | * | 480 | 480 | | | | 129 | 437 |
| Elmendorf Tear MD | g | * | * | 77 | 42 | | | | 64 | 40 |
| Elmendorf Tear TD | g | * | * | 166 | 119 | | | | 33 | 59 |
| Tear ratio (=TD/MD) | — | * | * | 2.2 | 2.8 | | | | 0.5 | 1.5 |

Blowing condition: Blow Up Ratio = 3:1 - Neck Height = 5 × D

| | Units | A comp | B comp | 2 | 4 | 5 | 6 | 7 | Comp. 1 | Comp. 2 |
|---|---|---|---|---|---|---|---|---|---|---|
| Impact | g | * | * | | | | | 420 | 144 | |
| Elmendorf Tear MD | g | * | * | | | | | 93 | 44 | |
| Elmendorf Tear TD | g | * | * | | | | | 61 | 58 | |
| Tear Ratio (=TD/MD) | — | * | * | | | | | 0.7 | 1.3 | |

* = Film blowing not possible

Comparative Examples A and B as shown in Tables 1-3 do not exhibit the appropriate rheological and structural properties to enable films to be blown under the conditions described in Section C above. However, by the use of appropriate additives and conditions during compounding, the rheological properties of Examples A and B can be adjusted so as to enable them to be blown into films. Thus Examples 2 and 5 are reticulated versions of Examples A and B, and have excellent processability and mechanical properties (Table 4).

Similar tailoring of the rheological properties can also be achieved with the use of peroxide, rather than oxygen, during compounding, as illustrated by Example 6.

TABLE 5

Compounded pellet and film properties, Examples C, C1, C2

| EXAMPLE | C Comparative | C1 | C2 Comparative |
|---|---|---|---|
| Composition after pelletisation on an LCM 100H Extruder | | | |
| G'(G" = 3000) (Pa) | 1400 | 2625 | 1703 |
| $\eta^*_{100}$ (Pa · s) | 2875 | 2800 | 2929 |
| Film properties (BUR = 4:1, Neck Height = 6 × D) | | | |
| Film thickness (μm) | 25 | 25 | 25 |
| DDT (g) | 336 | 250 | 503 |
| Elmendorf MD (g) | | | 83 |
| Elmendorf TD (g) | | | 96 |

A high DDT value combined with a high Elmendorf Tear Resistance in the MD direction combined with a ratio of (Elmendorf Tear Resistance in the TD direction) to (Elmendorf Tear Resistance in the MD direction) approaching unity (a balanced orientation film is achieved when this tear resistance ratio along both MD and TD directions=1) are known to be desirable characteristics of blown HDPE films. Example C2 displays these desirable characteristics to a greater degree than Examples C and C1. This demonstrates that an optimum increase in G'(G"=3000) during compounding is required to give the best film performance on products made from the composition; whilst an increased G' (G"=3000) is desirable in order to improve polymer processability (e.g., the melt strength and bubble stability of the resin). Increasing G'(G"=3000) too much during compounding can adversely affect mechanical properties such as impact performance to an unacceptable degree.

Although Example C2 has a relatively low value of G'(G"=3000) such that it is outside the scope of the present invention, it can be seen from FIG. 1 that it has a higher G'(G"=3000) than Example C, and appropriate choice of blend ratios (e.g. between Example C and Example C1 in this particular blend) can result in a resin having a relationship of G'(G"=3000) and dynamic viscosity $\eta^*_{100}$ inside the present invention, whilst at the same time presenting excellent mechanical properties.

It should also be noted that blending Examples C (DDT impact=336 g) and C1 (DDT impact=250 g) in a 50:50 weight ratio resulted in a composition C2 having a DDT impact of 503 g.

The invention claimed is:

1. A film formed from a polyethylene resin composition which obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>−0.86$\eta^*_{100}$+z where z=3800, and at the same time (b) G'(G"=3000)>

$0.875\eta^*_{100}-y$ where y=650, and having an impact strength (DDT) of at least 250 g, measured on 15 μm thick film (blown under conditions with BUR=5:1 and Neck Height=8×D) conditioned for 48 hours at 20-25° C., according to ASTM D1709.

2. A film according to claim 1, wherein the polyethylene resin composition is a multimodal composition comprising from 30 to 70 wt % of an ethylene polymer (A) having a melt index $MI_2$ of 5 to 1000 g/10 min and a density of at least 965 kg/m³, and from 30 to 70 wt % of an ethylene polymer (B) having a melt index $MI_5$ of 0.001 to 2 g/10 min and a density of 910 to 945 kg/m³.

3. A film according to claim 2, wherein the ethylene polymer (A) is a homopolymer, and the ethylene polymer (B) is a copolymer of ethylene and a $C_4$-$C_8$ alpha-olefin.

4. A film formed from a polyethylene resin composition which obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>-$0.86\eta^*_{100}$+z where z=3850, and at the same time (b) G'(G"=3000)> $0.875\eta^*_{100}$-y where y=650, and having an impact strength (DDT) of at least 250 g, measured on 15 μm thick film (blown under conditions with BUR=5:1 and Neck Height=8×D) conditioned for 48 hours at 20-25° C., according to ASTM D1709.

5. A film formed from a polyethylene resin composition which obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>-$0.86\eta^*_{100}$+z where z=3900, and at the same time (b) G'(G"=3000)> $0.875\eta^*_{100}$-y where y=650, and having an impact strength (DDT) of at least 250 g, measured on 15 μm thick film (blown under conditions with BUR=5:1 and Neck Height=8×D) conditioned for 48 hours at 20-25° C., according to ASTM D1709.

6. A film formed from a polyethylene resin composition which obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>-$0.86\eta^*_{100}$+z where z=3800, and at the same time (b) G'(G"=3000)> $0.875\eta^*_{100}$-y where y=550, and having an impact strength (DDT) of at least 250 g, measured on 15 μm thick film (blown under conditions with BUR=5:1 and Neck Height=8×D) conditioned for 48 hours at 20-25° C., according to ASTM D1709.

7. A film formed from a polyethylene resin composition which obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>-$0.86\eta^*_{100}$+z where z=3800, and at the same time (b) G'(G"=3000)> $0.875\eta^*_{100}$-y where y=450, and having an impact strength (DDT) of at least 250 g, measured on 15 μm thick film (blown under conditions with BUR=5:1 and Neck Height=8×D) conditioned for 48 hours at 20-25° C., according to ASTM D1709.

8. A film formed from a polyethylene resin composition which obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>-$0.86\eta^*_{100}$+z where z=3800, and at the same time (b) G'(G"=3000)> $0.875\eta^*_{100}$-y where y=350, and having an impact strength (DDT) of at least 250 g, measured on 15 μm thick film (blown under conditions with BUR=5:1 and Neck Height=8×D) conditioned for 48 hours at 20-25° C., according to ASTM D1709.

9. A film according to claim 1, wherein G'(G"=3000) is less than 2650.

10. A film according to claim 9, wherein G'(G"=3000) is less than 2550.

11. A film according to claim 1, wherein the composition has been subjected to reticulation during a compounding step which has increased the value of z and decreased the value of y.

12. A film comprising a blend of 20 to 80 wt % of a first polyethylene resin composition and 80 to 20 wt % of a second polyethylene resin composition, wherein said first and second polyethylene resin compositions each obey a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>-$0.86\eta^*_{100}$+z where z=3800, and at the same time (b) G'(G"=3000)>$0.875\eta^*_{100}$-y where y=650, and having an impact strength (DDT) of at least 250 g, measured on 15 μm thick film (blown under conditions with BUR=5:1 and Neck Height=8×D) conditioned for 48 hours at 20-25° C., according to ASTM D1709.

13. A film according to claim 1, which is formed from a composition capable of being obtained by a process in which:
in a first reactor, ethylene is polymerized in suspension in a first mixture comprising a diluent, hydrogen, a catalyst based on a transition metal and a cocatalyst, so as to form from 30 to 70% by weight with respect to the total weight of the composition of an ethylene homopolymer (A);
said first mixture is withdrawn from said reactor and is subjected to a reduction in pressure, so as to degas at least a portion of the hydrogen to form an at least partially degassed mixture, and said at least partially degassed mixture, together with ethylene and a $C_4$-$C_8$ alpha-olefin and, optionally, at least one other alpha-olefin, are introduced into a subsequent reactor and a suspension polymerization is carried out therein in order to form from 70 to 30% by weight with respect to the total weight of the composition of a copolymer of ethylene and a $C_4$-$C_8$ alpha-olefin (B).

14. A process for making a film, comprising the steps of polymerizing ethylene and optionally comonomer, and then compounding the resultant polyethylene composition to form it into pellets, and then forming the composition into a film, wherein the film obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>-$0.86\eta^*_{100}$+z where z=3800, and at the same time (b) G'(G"=3000)> $0.875\eta^*_{100}$-y where y=650, and having an impact strength (DDT) of at least 250 g, measured on 15 μm thick film (blown under conditions with BUR=5:1 and Neck Height=8×D) conditioned for 48 hours at 20-25° C., according to ASTM D1709.

15. A process for making a film according to claim 14, wherein the polyethylene composition is a multimodal polyethylene resin composition comprising from 30 to 70 wt % of an ethylene homopolymer (A) having a melt index $MI_2$ of 5 to 1000 g/10 min and a density of at least 965 kg/m$^3$, and from 70 to 30 wt % of an ethylene copolymer (B) having a melt index $MI_5$ of 0.001 to 2 g/10 min and a density of 910 to 945 kg/m$^3$, wherein said multimodal polyethylene resin composition is obtained by polymerizing, in a first reactor, ethylene in suspension in a first mixture comprising a diluent, hydrogen, a polymerization catalyst and a cocatalyst, so as to form from 30 to 70% by weight with respect to the total weight of the composition of an ethylene homopolymer (A), withdrawing said mixture from said reactor and subjecting said mixture to a reduction in pressure so as to degas at least a portion of the hydrogen to form an at least partially degassed mixture, then introducing said at least partially degassed mixture, together with ethylene and a $C_4$-$C_8$ alpha-olefin and, optionally, at least one other alpha-olefin, into a subsequent reactor and carrying out a suspension polymerization therein in order to form from 70 to 30% by weight, with respect to the total weight of the composition, of a copolymer of ethylene and of $C_4$-$C_8$ alpha-olefin (B).

16. A process for making a film according to claim 15, wherein the polymerization catalyst is a mixed alcoholate catalyst containing 5 to 30% by weight of transition metal, 0.5 to 20% by weight of magnesium, 20 to 60% by weight of chlorine and 0.1 to 10% by weight of aluminium, and having a residual organic radical content in the precipitated catalyst of less than 35 wt %.

17. A process for making a film according to claim 16, wherein the catalyst contains 8 to 16% by weight of transition metal, 5 to 15% by weight of magnesium, 40 to 60% by weight of chlorine and 0.1 to 5% by weight of aluminium, and has a residual organic radical content in the precipitated catalyst of less than 35 wt %, with less than 20 wt % total alkyl benzoate.

18. A process for making a film according to claim 16, wherein the compounding conditions are selected so as to reticulate the composition such that after compounding the value of z is greater than before compounding, and the value of y is less than before compounding.

19. A process for making a film according to claim 18, wherein the compounding step increases the value of z by at least 100, and decreases the value of y by at least 100.

20. A process for making a film according to claim 19, wherein the compounding step increases the value of z by 400 to 1200.

21. A process for making a film according to claim 19, wherein the compounding step decreases the value of y by 400 to 1200.

22. A process for making a film according to claim 14, wherein the film is a blown film.

23. A process for making a film, comprising the steps of polymerizing ethylene and optionally comonomer, and then compounding the resultant polyethylene composition to form it into pellets, and then forming the composition into a film, wherein the film obeys a dynamic rheological relationship at 190° C. between melt storage modulus G', measured in Pa and at a dynamic frequency where the loss modulus G"=3000 Pa, and dynamic complex viscosity $\eta^*_{100}$, measured in Pa·s at 100 rad/s, such that (a) G'(G"=3000)>$-0.86\eta^*_{100}$+z where z=3800, and at the same time (b) G'(G"=3000)>$0.875\eta^*_{100}$-y where y=650, and having an impact strength (DDT) of at least 250 g, measured on 15 µm thick film (blown under conditions with BUR=5:1 and Neck Height=8×D) conditioned for 48 hours at 20-25° C., according to ASTM D1709, wherein the polyethylene composition comprises a blend of 20 to 80 wt % of a first composition and 80 to 20 wt % of a second composition, wherein said first and second compositions are each made by a process in which:

in a first reactor, ethylene is polymerized in suspension in a first mixture comprising a diluent, hydrogen, a catalyst based on a transition metal and a cocatalyst, so as to form from 30 to 70% by weight with respect to the total weight of the composition of an ethylene homopolymer (A);

said first mixture is withdrawn from said reactor and is subjected to a reduction in pressure, so as to degas at least a portion of the hydrogen to form an at least partially degassed mixture, and said at least partially degassed mixture, together with ethylene and a $C_4$-$C_8$ alpha-olefin and, optionally, at least one other alpha-olefin, are introduced into a subsequent reactor and a suspension polymerization is carried out therein in order to form from 70 to 30% by weight with respect to the total weight of the composition of a copolymer of ethylene and a $C_4$-$C_8$ alpha-olefin (B).

* * * * *